(12) United States Patent
Kamijo

(10) Patent No.: US 7,086,853 B2
(45) Date of Patent: Aug. 8, 2006

(54) STARTUP COMBUSTOR FOR A FUEL CELL

(75) Inventor: Motohisa Kamijo, Kanagawa (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 10/733,369

(22) Filed: Dec. 12, 2003

(65) Prior Publication Data
US 2005/0130085 A1 Jun. 16, 2005

(51) Int. Cl.
*F23C 5/00* (2006.01)

(52) U.S. Cl. ............................................. 431/8

(58) Field of Classification Search .............. 431/2, 431/216, 8, 215, 171, 172, 356, 354; 429/19, 429/17, 20
See application file for complete search history.

(56) References Cited

U.S. PATENT DOCUMENTS

| | | | |
|---|---|---|---|
| 5,437,123 A * | 8/1995 | Greiner et al. | 48/107 |
| 6,413,661 B1 | 7/2002 | Clingerman et al. | |
| 2001/0031387 A1 * | 10/2001 | Takeda et al. | 429/20 |
| 2001/0045061 A1 | 11/2001 | Edlund et al. | |
| 2002/0031690 A1 | 3/2002 | Shimazu et al. | |
| 2004/0043343 A1 * | 3/2004 | Kamijo | 431/2 |

FOREIGN PATENT DOCUMENTS

JP 2002-012406 1/2002

* cited by examiner

*Primary Examiner*—S. Gravini
(74) *Attorney, Agent, or Firm*—McDermott Will & Emery LLP

(57) ABSTRACT

A combustor having a filter used to trap soot generated during its operation that is arranged upstream of a fuel reformer, is disclosed. During a startup period, the combustor functions to regenerate the filter by burning the trapped soot with a lean fuel-air mixture thereby regenerating the filter while continuously heating downstream components.

3 Claims, 10 Drawing Sheets

STARTUP COMBUSTOR FOR A FUEL CELL

FIELD OF THE INVENTION

The invention relates to a startup combustor for a fuel reforming system and particularly to a combustor used to warm up a fuel reformer that generates a reformate stream containing hydrogen.

Fuel cells have been developed as alternative power sources such as for electrical vehicles. A fuel cell is a demand-type power system in which the fuel cell operates in response to the load imposed across the fuel cell. Typically, a hydrocarbon fuel such as gasoline, methanol, diesel, naphtha, etc. serves as a fuel supply for the fuel cell. During operation, the fuel is converted to a gaseous stream containing hydrogen. The conversion is usually accomplished by passing the fuel through a fuel reformer to convert the hydrocarbon to a hydrogen gas stream. The hydrogen is then used by the fuel cell to generate electricity to power the vehicle.

In a gasoline reformation process, steam, air and gasoline are reacted in a fuel processor which typically contains two sections. One is primarily a partial oxidation reactor and the other is primarily a steam reformer. The fuel processor produces hydrogen, carbon dioxide, carbon monoxide and water. Downstream reactors such as water/gas shift (WGS) and preferential oxidizer (PROX) reactors are used to produce carbon dioxide from carbon monoxide using oxygen from air as an oxidant.

Once a fuel cell is being operated, it can run smoothly at an optimum temperature and efficiency. At start-up, however, the reformer of the fuel processing system requires a certain temperature, which is typically above ambient, to run efficiently. Typically, the reformer of the fuel processing system is heated to bring it to an efficient operating temperature. This can be done by a startup combustor, which typically burns fuel upstream of the reformer to indirectly heat the reformer with the combusted gasses.

A typical problem in such fuel reforming systems is the generation of soot within the system due to the incomplete combustion of hydrocarbon fuel. Soot can contaminate catalysts and other system components thereby adversely affecting the system's operation. JP 2002-012406 discloses a fuel reforming apparatus that collects soot in a filter downstream of a reformer and subsequently burns the collected soot by a process that includes increasing air to the system at set intervals.

There is a continuing need, however, for the efficient heating of a fuel cell system at start-up that minimizes the adverse affects of soot.

SUMMARY OF THE INVENTION

An advantage of the present invention is a startup combustor having a filter that is arranged upstream of a fuel reformer, which traps soot generated at startup. During the startup period, the startup combustor functions to regenerate the filter by burning, i.e., oxidizing, the trapped soot by combusting a lean fuel-air mixture in the startup combustor thereby regenerating the filter while continuously heating downstream system components.

These and other advantages are satisfied, at least in part, by a fuel processing system that includes a startup combustor having a filter. In an embodiment of the present invention, the startup combustor comprises a chamber for combusting fuel; an air port connected to the chamber for introducing air to the chamber; a fuel port connected to the chamber for introducing fuel to the chamber; an ignition source connected to the chamber for igniting the fuel and air introduced thereto; and a filter that is connected to or included in the chamber which is located downstream of the ignition source for trapping any non-gaseous components, i.e., soot. The filter is advantageously capable of preventing at least a portion of any non-gaseous particles that may be formed during the combustion of the fuel in the chamber at the ignition source from passing therethrough. The filter can also prevent at least a portion of any non-gaseous particles contained in the air or fuel introduced to the chamber from passing through it as well.

Advantageously, the startup combustor functions to regenerate the filter by burning and eliminating the trapped soot by a lean-fuel combustion in the startup combustor, which can be accomplished by introducing an excess air to fuel ratio. For example, in regenerating the filter, an air compressor can control the volume of air introduced to the combustor; a fuel injector can control the amount of fuel to the combustor; and a computer can be programmed to control the rotation speed of the air compressor and the pulse width of the fuel injector according to operating condition. Each control parameter can be set by experiment in advance.

Embodiments of the present invention include a series of filters in or connected to the combustor which are located downstream of the ignition source or where combustion takes place; a port for introducing a cooling source to cool the outflow of gases exiting the one or more filters; a pressure gauge for detecting the pressure across the one or more filters at any given time; a reformer downstream of the filter for reforming the hydrocarbon fuel; a water/gas shift reactor downstream of the reformer for further reforming the hydrocarbon fuel; and a preferential catalyst downstream of the water/gas shift reactor for oxidizing various components contained in the reformed fuel.

Another aspect of the present invention includes a process for removing non-gaseous components, e.g., soot, in a combustor which are collected on a filter downstream of where combustion takes place. The process comprises combusting a hydrocarbon fuel to form a combustion gas stream that is then passed through a filter. As used herein, a combustion gas stream is meant the gases resulting from the combustion of a hydrocarbon fuel in a combustor. While the combusted gases contain carbon, hydrogen and oxygen based products, the gases are not limited thereto. The combustion gas stream at times can contain solid particles, which are likely carbon based. The combustion in this aspect of the invention takes place before the gases reach the reformer. The combusted gases are then passed through a filter, which collects or traps any solid particles contained in the combusted gas, referred to herein as soot. This soot can be reduced or eliminated from the filter by burning the fuel in the combustor at a leaner air-fuel mixture. Hence, the present invention advantageously permits the regeneration of the filter associated with the combustor while the combusted gases are continuously heating downstream components of the fuel processing system.

Embodiments of the present process includes determining the temperature of gases exiting the filter, i.e., the filter outflow temperature, and adjusting the temperature of the gases exiting the filter with a cooling source so that the inlet temperature of the reformer or any other component downstream of the combustor and the filter do not experience excessive temperatures that may degrade their performance.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The various features and advantages of the present invention will become more apparent and facilitated by reference to the accompanying drawings, submitted for purposes of illustration and not to limit the scope of the invention, where the same numerals represent like structure and wherein.

DESCRIPTION OF THE INVENTION

Figure 1:
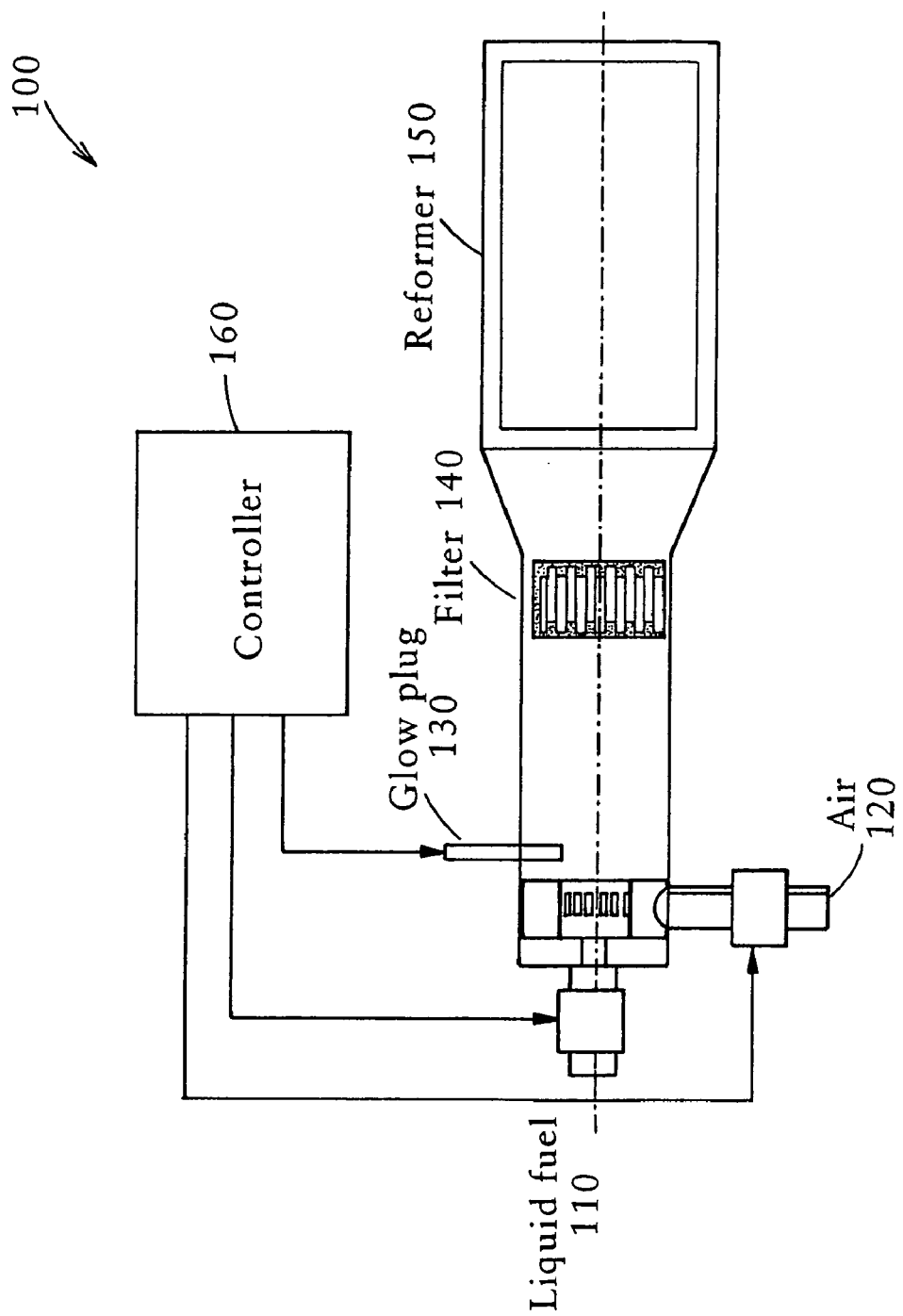
FIG. 1 illustrates the structure of one embodiment of a startup combustor according to the present invention.

The present invention is directed to the operation of a fuel cell system which comprises a combustor which heats a reformer, which in turn, generates a hydrogen rich stream for use in a fuel cell stack. It has been discovered that soot can be efficiently trapped and eliminated in the combustor during the start-up combustion, i.e. without stopping a heat-up or a normal operation. The fuel processing system of the present invention is suited for small-scale operation and optimally serves as a reforming system in a fuel cell generating device used in vehicles, such as automobiles.

In fuel cell systems, a reformer is provided which is effective to reform hydrocarbon fuels into a hydrogen rich fuel for introduction into the fuel cell. Typically, a reformer is combined with a shift reaction section to perform a water gas shift reaction for further conversion. In the water gas shift reaction, the hydrogen rich gas emanating from the reformer is reacted with water to shift the carbon monoxide in the gas to hydrogen and carbon dioxide, and thereby increase hydrogen content of the hydrogen rich gas.

Prior to reaching its normal operating temperature, the reformer needs to be heated to run smoothly. The combustor is used for heating system components, e.g., the reformer, and operates by combusting hydrocarbon fuel when the temperature of the reformer is below its optimum operating temperature. At start-up, or at a temperature below normal operating temperature, hydrocarbon fuel and air are reacted or burned in the combustor to heat downstream system components. The combusted fuel forms a combustion gas stream that does not contain any appreciable amount of hydrogen gas since this process takes place before the reformer. Combustion of the fuel however heats the reformer and other downstream components. After the fuel processor has attained and maintained a desired temperature, the combustor is usually no longer in use. The fuel system then produces a steadier hydrogen-rich stream, which is consumed in a fuel cell stack to produce electricity.

Generally, the combustor of the present invention will comprise: a chamber for combusting fuel; an air and fuel port connected to the chamber for introducing air and fuel to the chamber; and an ignition source connected to the chamber for igniting fuel introduced thereto. A filter is also included in or connected to the combustor, which is located down stream of the ignition source. The filter is capable of preventing at least a portion of any non-gaseous particles, i.e., solid particles, contained in the air or fuel or which can develop from combusting the fuel with the ignition source, from passing through it.

During the start-up combustion operation, soot, i.e. non-combusted or partially combusted hydrocarbons, particularly carbon-based particles, can develop. The present inventive apparatus advantageously traps a substantial portion or all of the soot that can develop in the combustor during its operation by a filter downstream of where the combustion takes place. The trapped soot is then reduced or eliminated by the introduction of a lean air-fuel mixture during the start-up combustion operation which is effective to burn the soot. As used herein, the term "a lean air-fuel mixture" or "an excess air ratio" means a ratio of air to fuel such that the quantity of air is greater than that needed to completely combust the fuel. Excess air ratios that are suitable in practicing the present invention include ratios of about 1.5 to about 2.8, where air is in excess of the amount needed to completely combust the particular hydrocarbon fuel.

By employing a lean air-fuel mixture to regenerate the filter, the startup combustor can continuously be operated to provide heat to the system while it is being regenerated, i.e., regeneration of the filter is contemplated as an in-situ process. In one aspect of the present invention, the filter is regenerated, i.e. soot collected on the filter is reduced or eliminated, by operating the combustor under a lean air-fuel mixture during the start-up operation of the fuel cell. Soot build-up, and the need for its removal, can be determined indirectly based on the operation history of the startup combustor or by measuring the pressure differential across the filter, which is indicative of the amount of fuel thereon.

In an embodiment of the present invention, a startup combustor can comprise a series of filters, i.e. more than one, arranged in series downstream of the combustion zone of the combustor. The series of filters is believed to increase the filter capacity for collection soot and can more efficiently utilize heat from the combustion of soot.

In another embodiment of the present invention, the system predicts the exhaust gas temperature downstream of the filter during a regeneration operation based upon any number of input values, such as the ratio of air to fuel entering the combustor, the amount of soot estimated or measured on the filter, etc. If the exhaust temperature downstream of the filter is too high, the system can lower the temperature of the stream at the inlet of the reformer as, for example, by mixing water or air with the exhaust gases. It is preferred that the temperature of the reformer be maintained below that which would induce degradation of the reformer catalyst and other components contained therein, such as below about 1000° C., and that the temperature at the inlet of any Water/Gas shift (WGS) reactor be less than that which would degrade its performance, such as less than about 700° C.

FIG. 1 illustrates an example of a startup combustor, such as that which can be included in a fuel cell system (not shown). The fuel cell can be used in a vehicle (not shown) as an energy source for vehicle propulsion. In the fuel cell system, a hydrocarbon is processed in a fuel processor, for example, by reformation and preferential oxidation processes, to produce a reformate gas which has a relatively high hydrogen content on a volume or molar basis. It is understood that the principles embodied herein are applicable to fuel cells fueled by $H_2$ obtained from any source, including reformable hydrocarbon and hydrogen-containing fuels such as methanol, ethanol, gasoline, alkene, or other aliphatic or aromatic hydrocarbons in liquid or gaseous forms.

In one aspect of the present invention, a startup combustor includes a source of fuel and air, a mechanism for igniting the air-fuel mixture, a filter downstream of the combustion of the fuel, and a controller for regulating the air-fuel mixture. As shown in FIG. 1, a startup combustor 100 can include fuel source 110, air source 120, glow plug 130 as an ignition source to combust the fuel, and controller 160 for regulating the air-fuel mixture and the ignition of the fuel. Combustion takes place at or near the glow plug 130. Downstream of the combustion zone, filter 140 is provided to trap or collect any non-gaseous components introduced by the fuel or air supply, or that may develop during the combustion of the fuel. By providing filter 140 between the combustion zone (located at or near glow plug 130) and reformer 150, the present invention advantageously prevents soot from entering the reformer.

Figure 2:
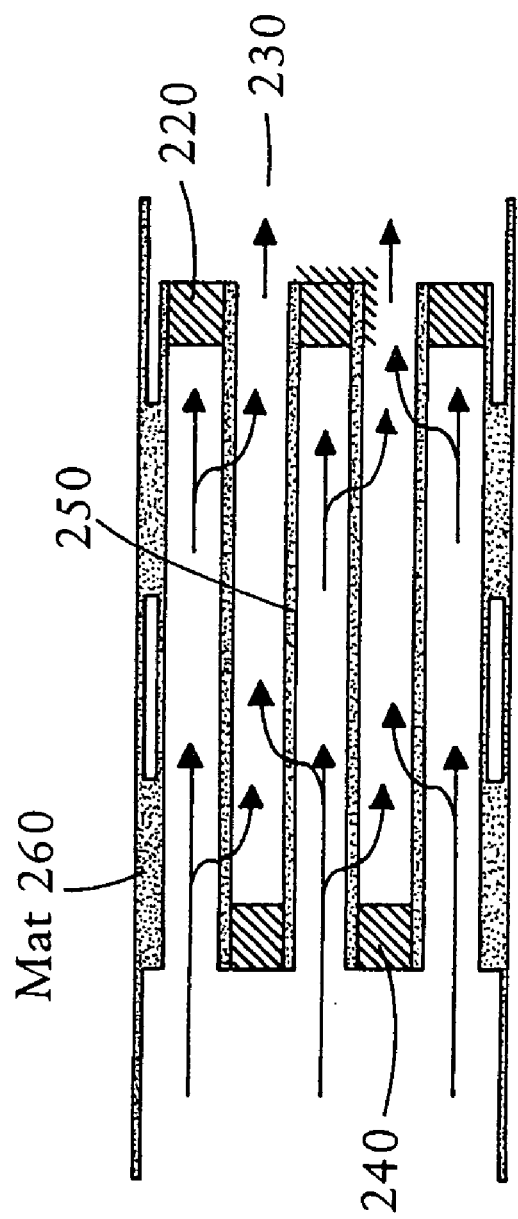
FIG. 2 shows one embodiment of a filter that can be used in accordance with the present invention.

The present inventive apparatus can employ any filter known in the art to trap soot in a fuel processing system. The filter can comprise materials and structures as known in the art, such materials and structures including silicon carbide (SiC), cordierite, and ceramic fiber, preferably with cavities having an effective diameter of about 10 to about 100 μm and a heat resistance of 1000° C. or more. In one embodiment, FIG. 2 shows the structure of a honeycomb filter that can be used in accordance with the present invention.

At start-up, soot accumulates on the honeycomb wall of filter 200. The mats 260 which are made of ceramic fiber and have non-reversible thermal expansibility hold the filter core, e.g., a SiC filter core, in the combustor chamber. A cylindrical SiC filter can be wrapped by mats 260. The wrapped SiC filter is set into the combustor chamber and is supported by the expanded mats 260 after first combustion.

In this example, honeycomb filter 200 is composed of porous material with multiple cavities. The combustion gas is passed through a series of passages. Inlet passages are composed of one in every two alternate cells, having their downstream ends closed with stopper 220. The filtered gas flows through filtered gas passages 230, which comprises each remaining alternate cell having their upstream ends closed with stopper 240. The surface of partition 250 can contain a reform catalyst on the side of the filtered gas passage 230.

When combusted gas containing hydrocarbons and carbon-based particles are supplied to a reformer and filtered through honeycomb filter 200, soot contained in the gas is trapped in the cavities. During exposure of a lean air-fuel mixture, the collected soot is burned off of the filter.

Figure 3:
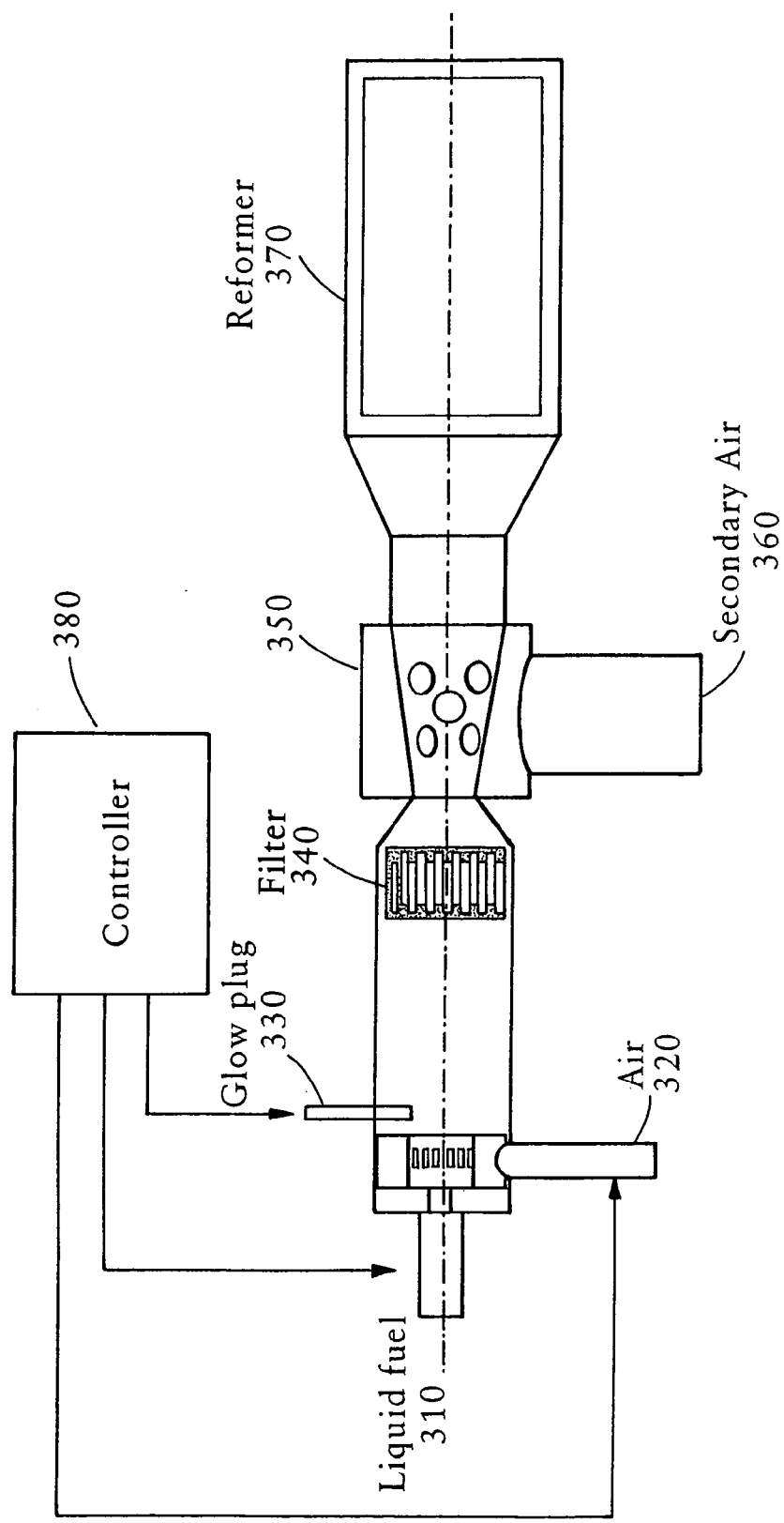
FIG. 3 shows another embodiment of a startup combustor in accordance with the present invention.

In another embodiment of the present invention, FIG. 3 illustrates the structure of a combustor with an air cooler 350. As shown in this figure, fuel source 310, air source 320 and glow plug 330 are upstream to filter 340. Controller 380 regulates the air-fuel mixture and the ignition of the apparatus. During operation, filter 340 collects any non-gaseous components introduced by the fuel or air supply, or that may develop during the combustion of the fuel and prevents the soot from affecting downstream components, such as reformer 370.

At a predetermined time, filter 340 is regenerated to reduce or eliminate soot that has collected onto it. This process is typically exothermic which can in turn heat the exhaust gas coming from the outlet of the filter to a temperature that could degrade the catalyst in reformer 370. To reduce the temperature of the gas stream entering the reformer, air can be circulated around or introduced into the gas stream exiting the filter through port 360. In another embodiment of the present invention, the fuel system can include a temperature sensor (not shown) after the filter to determine the temperature of the gases exiting the filter and/or at the inlet of the reformer.

Figure 4:
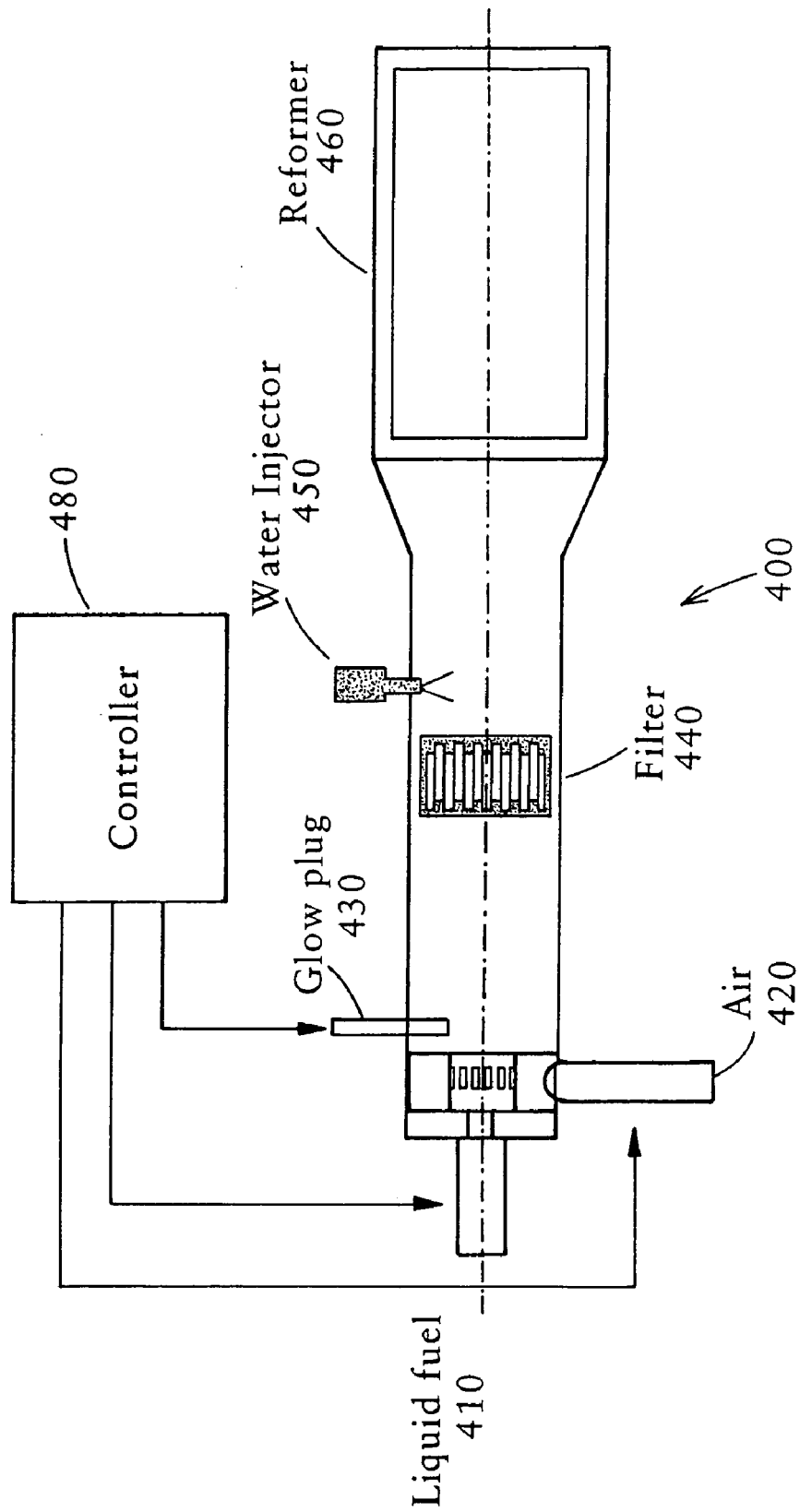
FIG. 4 illustrates yet another structure of a startup combustor that can be used in accordance with the present invention.

In another embodiment of the present invention, FIG. 4 shows a structure of a startup combustor that can reduce the inlet temperature of gases entering a reformer by introducing a water stream to the inlet gas through a port. As illustrated in this figure, startup combustor 400 includes fuel source 410, air source 420 and glow plug 430 for introducing fuel, air and combusting the fuel upstream of filter 440. Controller 480 regulates the air-fuel mixture and the ignition of the apparatus. During this operation, filter 440 collects any non-gaseous components introduced by the fuel or air supply, or that may develop during the combustion of the fuel and prevents the soot from affecting downstream components, such as reformer 460.

At a predetermined time, filter 440 is regenerated to reduce or eliminate any non-gaseous particles, i.e., soot, that has collected onto it. This process is typically exothermic which can in turn heat the exhaust gas coming form the outlet of the filter to temperatures that could degrade the catalyst in reformer 460. To reduce the temperature of the gas stream entering the reformer, water can be introduced by a water injector 450 into the combusted gas upstream of reformer 460.

Figure 5:
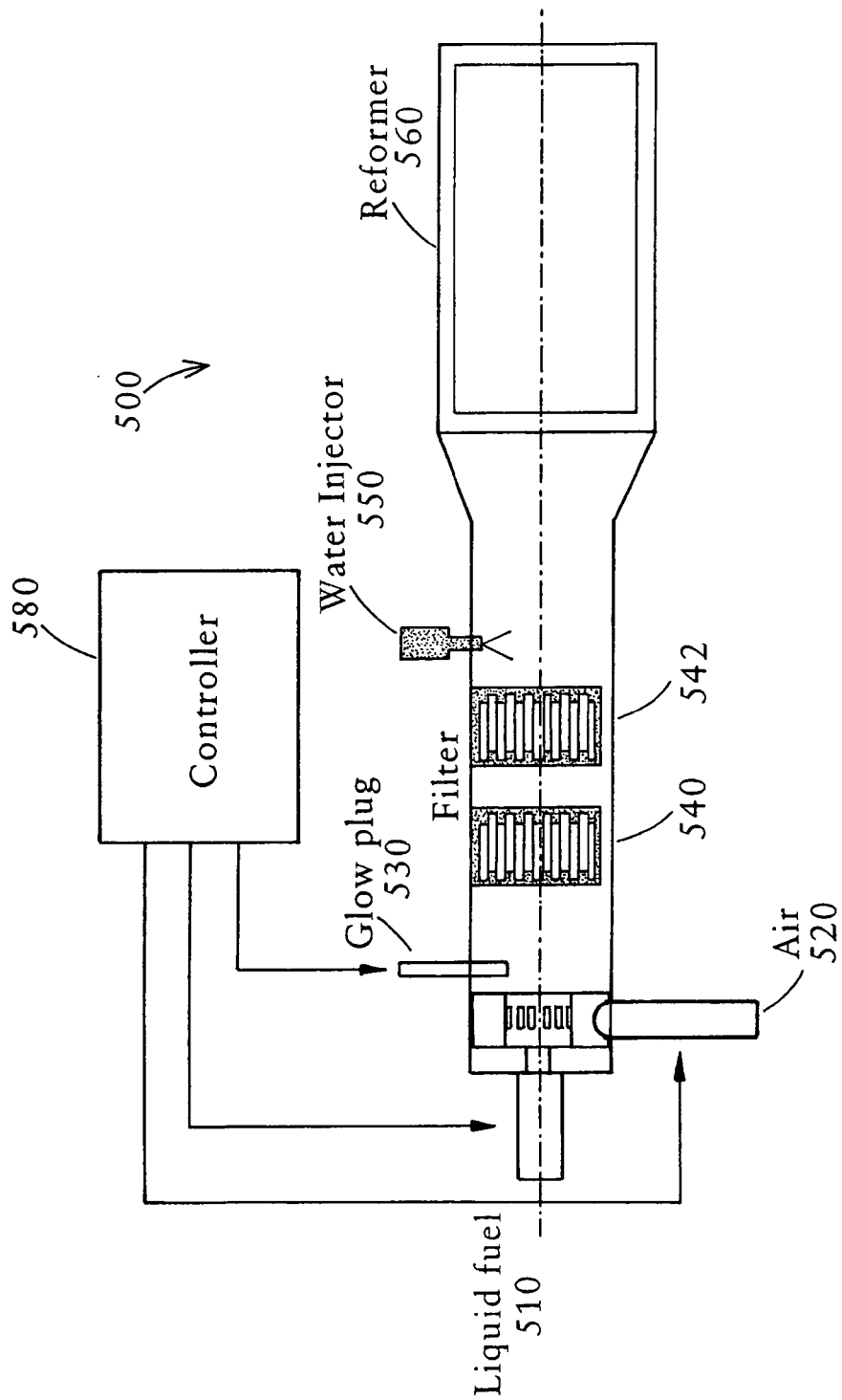
FIG. 5 shows yet another embodiment of a startup combustor that can be used in accordance with the present invention.

In another embodiment of the present invention, FIG. 5 shows a structure of a startup combustor that contains a series of filters. As illustrated in this figure, startup combustor 500 includes fuel source 510, air source 520 and glow plug 530 for introducing fuel, air and combusting the fuel upstream of filters 540 and 542. Controller 580 regulates the air-fuel mixture and the ignition of the apparatus. During this operation, filters 540 and 542 collect any non-gaseous components, i.e., soot, introduced by the fuel or air supply, or that may develop during the combustion of the fuel and prevents the soot from affecting downstream components, such as reformer 560.

At a predetermined time, filters 540 and 542 are regenerated to reduce or eliminate soot that has collected onto them. This process is typically exothermic which can in turn heat the exhaust gas coming from the outlet of the filter to temperatures that could degrade the catalyst in reformer 560. To reduce the temperature of the gas stream entering the reformer, water can be introduced by water injector 550 into the combusted gas upstream of reformer 560.

Figure 6:
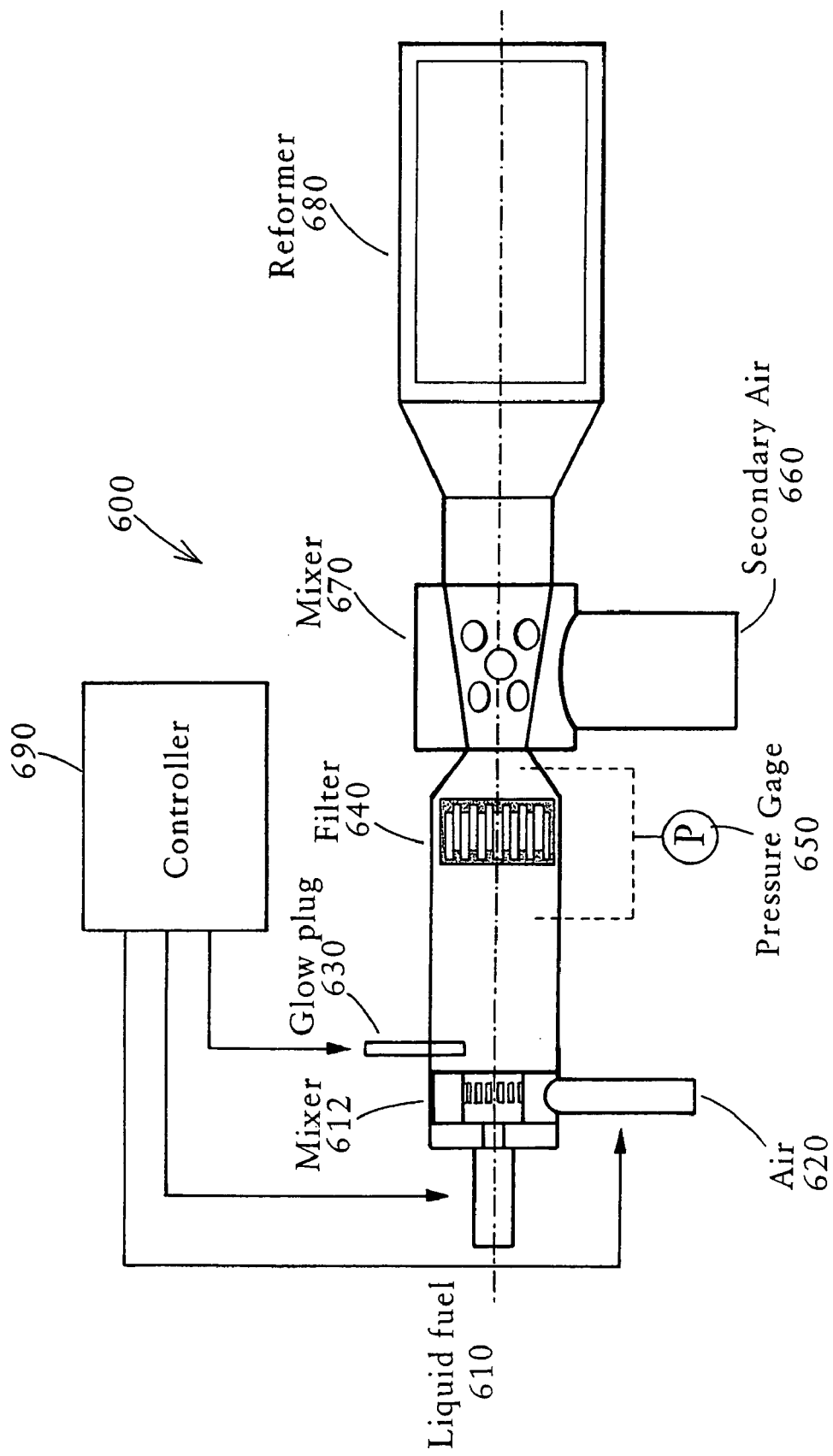
FIG. 6 illustrates yet another embodiment of a startup combustor that can be used in accordance with the present invention.

In another embodiment of the present invention, FIG. 6 shows a structure of a startup combustor that includes a pressure gage to measure the pressure difference across the filter together with other features. As illustrated in this figure, startup combustor 600 includes fuel source 610, air source 620 and glow plug 630 for introducing fuel and air, and for combusting the fuel upstream of filter 640. Controller 690 regulates the air-fuel mixture and the ignition of the apparatus. During this operation, filter 640 collects any non-gaseous particles introduced by the fuel or air supply, or that may develop during the combustion of the fuel and prevents the collected particles, i.e. soot, from affecting downstream components, such as reformer 680. An air port 660 and cooling chamber 670 are included in this structure for cooling the filter outflow gases, if necessary.

Figure 7:
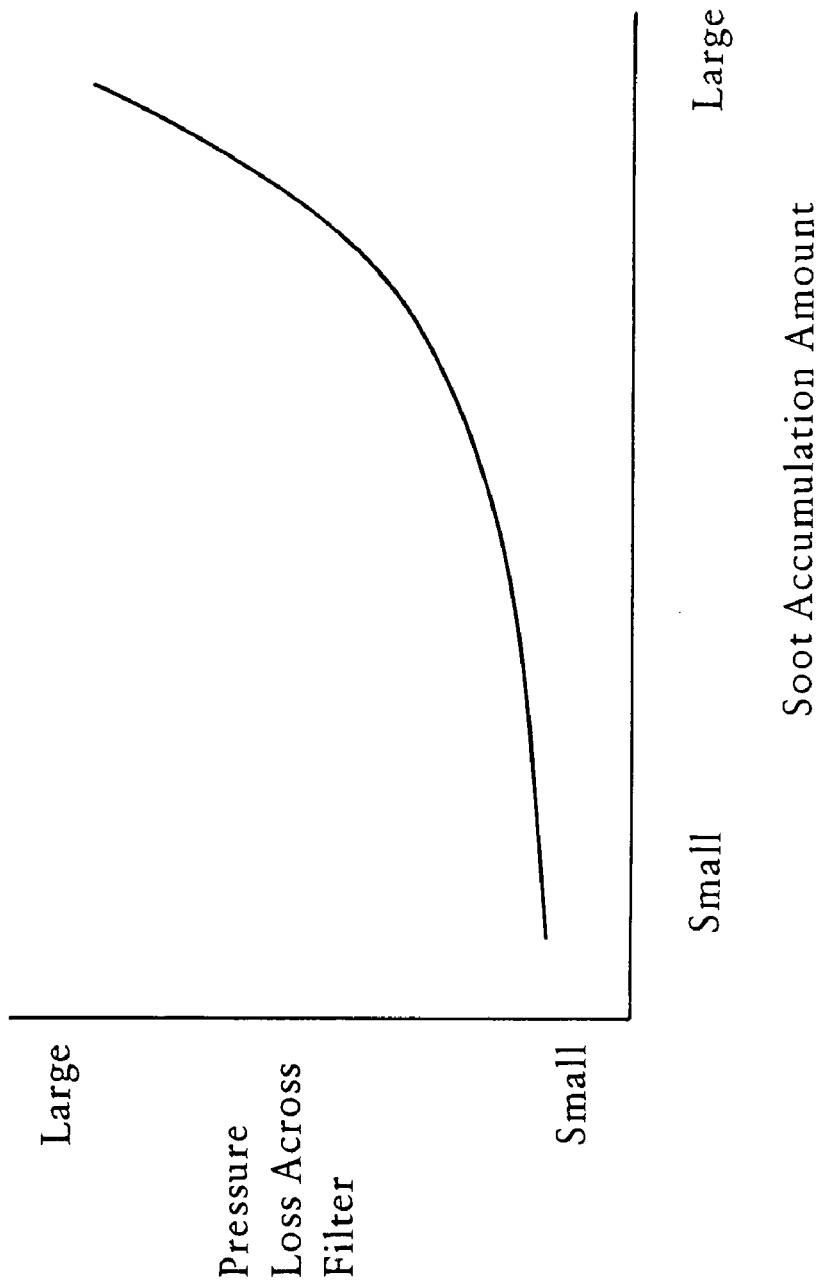
FIG. 7 is a chart showing the relationship between the pressure loss across a filter downstream of a combustor versus the amount of soot that accumulates on the filter.

In this embodiment of the present invention, the amount of soot built-up and consequently the time to regenerate the filter can be measured directly by pressure gauge 650, which can calculate the pressure difference of the atmosphere upstream and downstream of filter 640. As shown in the chart of FIG. 7, soot accumulation onto the filter would tend to increase the pressure loss across the filter. It is expected that the pressure differential would increase exponentially as soot accumulates on the filter. This graph can be prepared by correlating the pressure loss versus the level of soot accumulated on the filter, as determined experimentally, so that a predetermined pressure loss value can be determined which is indicative of the need to regenerate the filter.

Figure 8:
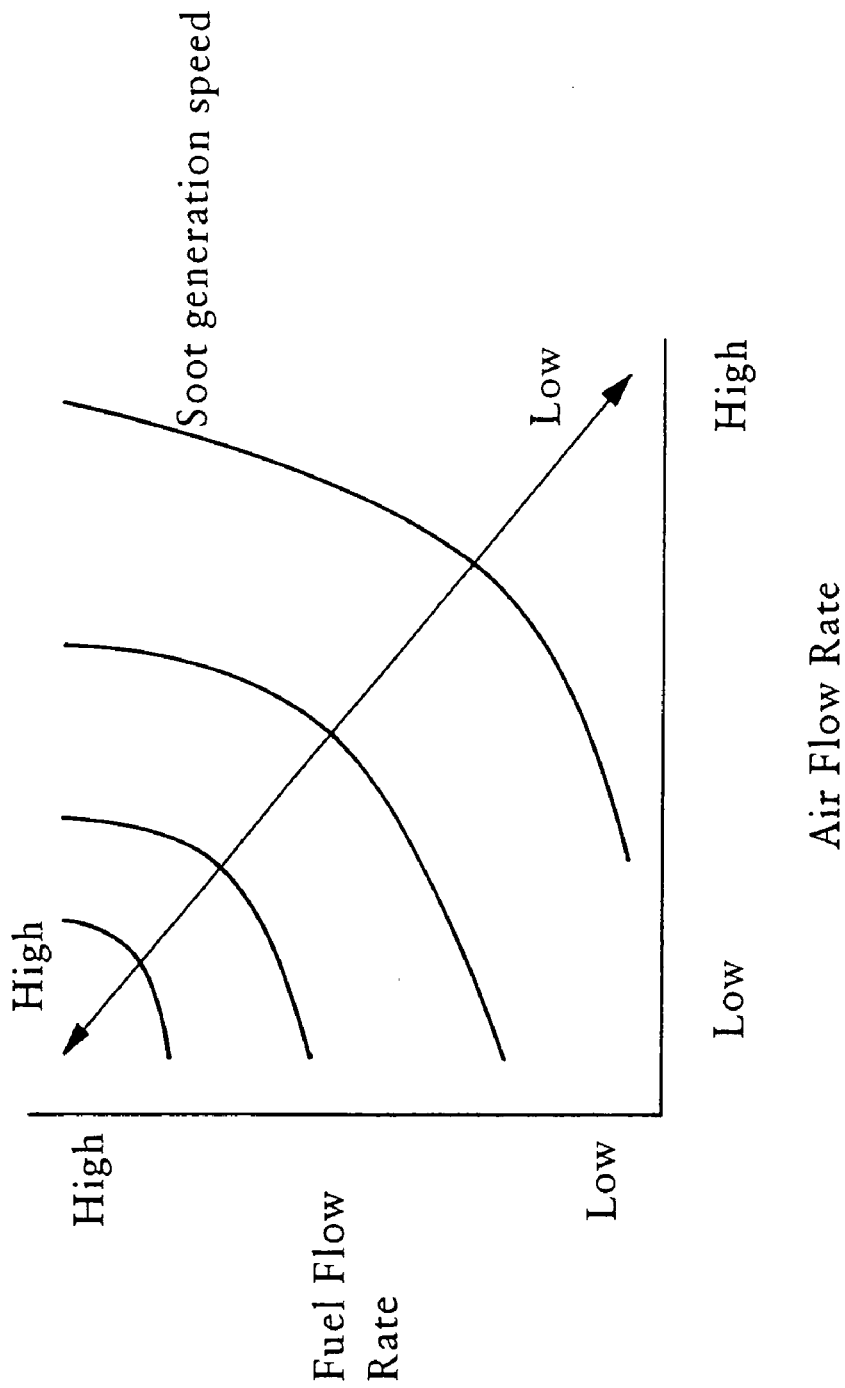
FIG. 8 is a chart illustrating the relationship among fuel flow rate, air flow rate and the expected level of soot that can be formed during combustion.

Alternatively, or in conjunction to pressure measurements, the estimated amount of soot collected onto the filter can be determined by previous testing of variables such as air flow rate and/or fuel flow rate, the length of time for start-up combustion, the number of startup combustion operations, etc. As an example, FIG. 8 illustrates a soot discharge map based upon air and fuel flow rates.

From the operating set point and operating time of combustor, the computer which controls the Fuel Processing System can calculate the amount of soot that was generated from the combustor and trapped on the filter. Regeneration of the filter can occur when the calculated amount of soot exceeds a predetermined value.

At the predetermined value, filter 640 is regenerated to reduce or eliminate soot that has collected onto it. This process is accomplished by introducing an excess air ratio into the combustor for combustion of the fuel as well as oxidation (combustion) of the collected soot. Because a lean air-fuel mixture is used to burn the soot, the combustor can operate to warm-up the downstream components concurrently while the filter is being regenerated. The startup combustor functions to regenerate the filter by burning and eliminating the trapped soot by a lean-fuel combustion. For example, in regenerating the filter, an air compressor can control the volume of air introduced to the combustor; a fuel injector can control the amount of fuel introduced to the combustor; and a computer can be programmed to control the rotation speed of the air compressor and the pulse width of the fuel injector according to operating condition. Each control parameter can be set by experiment in advance and can be set to introduce an excess air ratio to regenerate the filter during the regeneration operation.

In one embodiment of the present invention an excess air ratio of about 2.5 to about 1.5 can be used. It has been determined that if air is in excess of about 3 to fuel, the gas temperature at the inlet of the filter is approximately 900° C., which is the temperature desired for normal operation in this example. At a ratio of about 2.5, the temperature at the filter inlet increases to approximately 1000° C.; at a ratio of about 2.0, the filter inlet temperature increases to about 1200° C.; and at a ratio of about 1.5, the temperature at the filter inlet increases to about 1500° C. The excess air ratio can be expressed by the formula, $\lambda_a/\lambda_0$, where $\lambda_0$ is air/fuel mass ratio at complete combustion and $\lambda_a$ is air/fuel mass ratio at actual combustion. By raising the temperature of the filter, it has been found that soot removal is enhanced.

Figure 9:
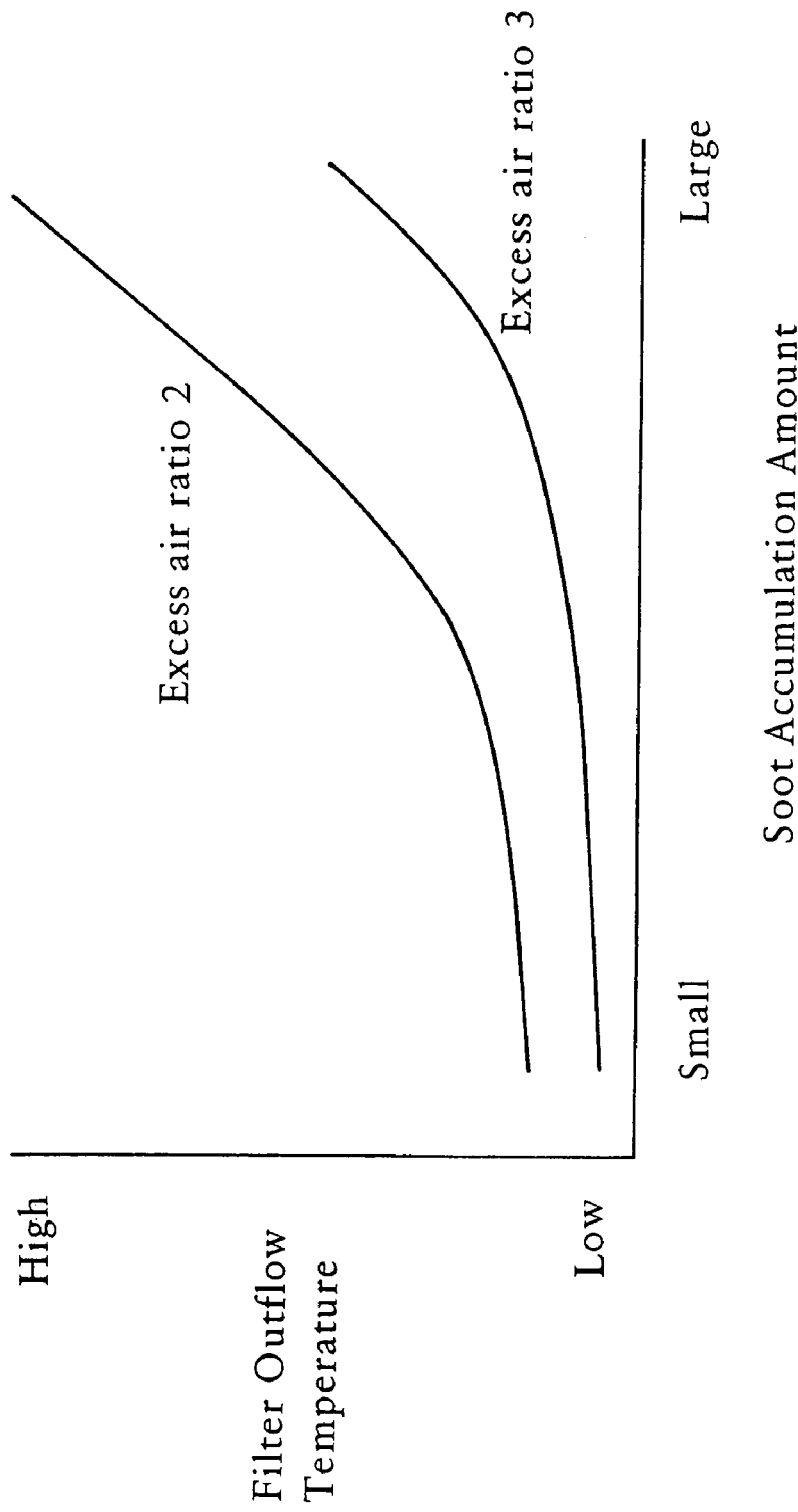
FIG. 9 is a chart illustrating the relationship between the expected filter outflow temperature and soot amount for various excess air ratios.

Typically, the regeneration of the filter involves combusting the accumulated soot, which is an exothermic event and which can further heat the exhaust gas coming from the outlet of the filter to temperatures that could degrade the catalyst in reformer 680. The amount of temperature increase then is a function of the amount of accumulated soot on the filter and can be estimated by testing. FIG. 9 illustrates a chart that shows the expected temperature increase that can be attributed to a given amount of soot for a given excess air ratio. It is understood that increasing the ratio of air tends to lower the overall temperature of the combusted gases, as noted above and as shown in FIG. 9. Thus a relationship among air flow, fuel flow, soot accumulation and filter outlet temperature can be determined by testing a given combustor design. These input variables can then be used in operating the combustor to determine a threshold level when the filter needs to be regenerated and when the filter outflow gases need to be cooled prior to entering the reformer.

Figure 10:
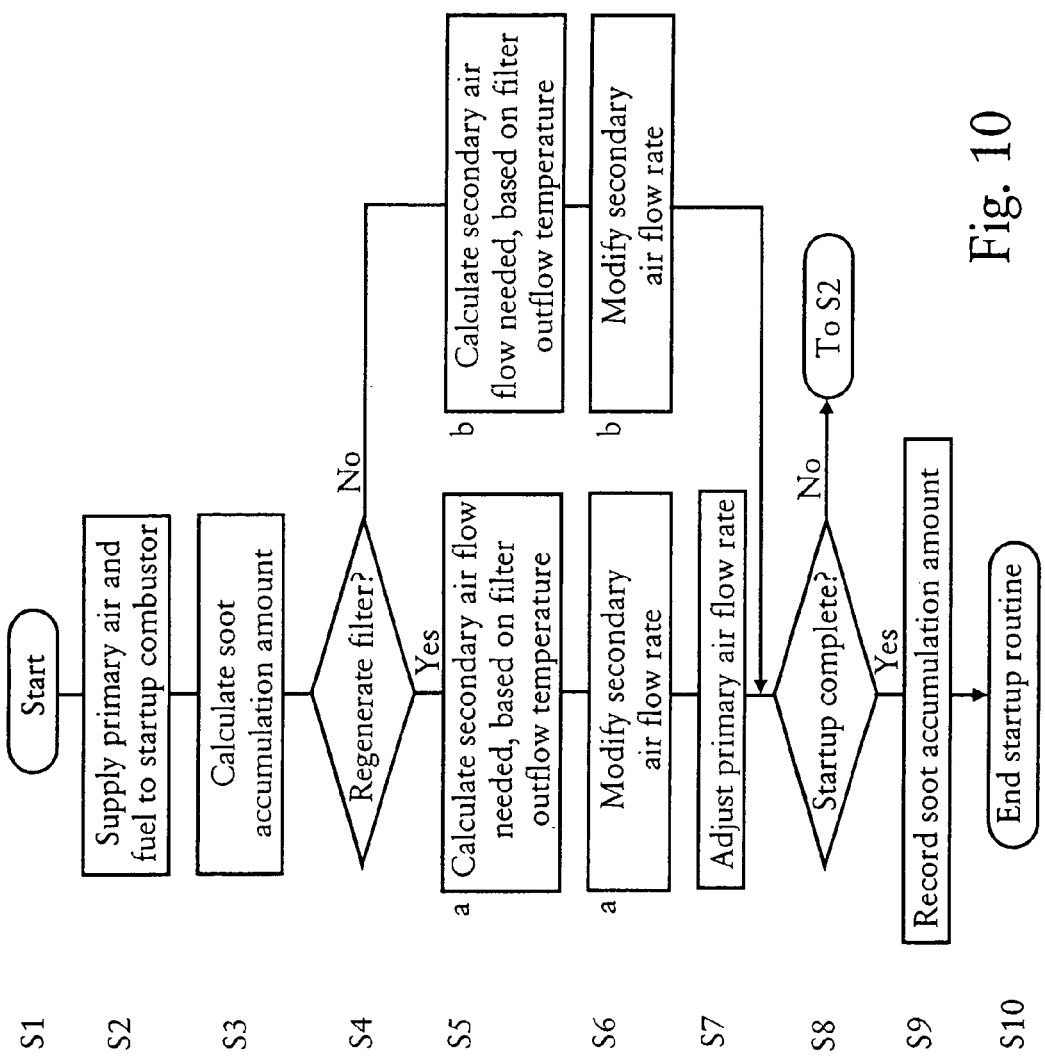
FIG. 10 is a flowchart showing the operation of one embodiment of the present invention for collecting and eliminating soot that has accumulated on a filter during the combustion of fuel in a combustor.

The operation of a combustor with a filter will be provided with reference to the flow diagram of FIG. 10. As is understood by those skill in the art, this operation can be computer controlled for optimum results in operation.

As seen in FIG. 10, start-up operation begins at S1. Fuel and air are supplied to a start combustor at S2 where fuel is burned to warm the system and any soot developed captured by the filter. At S3, the amount of soot collected is estimated or monitored. These values can be determined by use of a pressure gauge and/or by evaluating input variables to the system. When the soot accumulated onto the filter has reached or exceeds a predetermined tolerance level, e.g., about 5 grams, the filter is regenerated. S4 judges the variable or variables to determine whether the filter is in need of regeneration. The predetermined value can be established as, for example, by monitoring the pressure loss across the filter and when a particular value is reached, regeneration is deemed appropriate. A tolerance level can be determined by testing prototypes in which the mass of soot in a filter is measured relative to the signal from a suitably placed pressure gage.

If filter regeneration is necessary, as determined at S4, the filter is regenerated by combusting an excess air ratio, which in turn tends to increase the filter outflow temperature. To offset this temperature increase, the gas temperature at filter outflow is estimated at S5a. This can be done by directly measuring the outflow gas temperature or by estimating the outflow temperature based on input variables to the system, such as the air-fuel ratio introduced to the combustor. The system determines the necessary flow rate of a cooling source to lower the filter outflow gas temperature to an appropriate level at S5a and adjusts the cooling source at S6a.

In an embodiment of practicing the present invention, the system can determine the necessary flow rate of a cooling source based on the air-fuel ratio introduced to the combustor during filter regeneration. As an example, FIG. 9 illustrates the relationship among the excess air ratios and soot accumulation and the expected filter outflow temperature.

Based upon testing of prototypes, this relationship can be refined to a given combustor and used in calculating the expected filter outflow temperature and consequently the necessary cooling rate.

If filter regeneration is not necessary at the previous step (S4), then the system estimates the necessary flow rate of a cooling source to lower or maintain an appropriate filter outflow gas temperature at S5b and makes the necessary adjustment at S6b. In one embodiment of practicing the present invention, normal start-up combustion, e.g., without the need for filter regeneration, the system maintains an appropriate outflow gas temperature around 900° C. by introducing an air stream to the outflow gases of the filter before a reformer.

In addition to determining and adjusting the cooling source S5a and S6a, the system adjusts the excess air ratio to burn and reduce any soot that has accumulated on the filter when regenerating the filter at S7. As an example, the combustor can operate with an excess air ratio of about 3 during normal operation and when regenerating the filter, the excess air ratio can be reduced to 2 to burn and eliminate soot. By this process, the filter can be regenerated without interrupting the heating function of the combustor. Hence, the filter can be regenerated while the combustor provides continuous heat to the system.

At S8, the necessary time for warming-up the system is judged. In the present case, the necessary time for warm-up can be predetermined by experiment in the lab and the lapse of a fixed time is measured. It is also possible to monitor the temperature of the combusted gas or some downstream component, such as the PROX at the most downstream point in the fuel processing system to determine if it exceeds a predetermined temperature. If the predetermined time has not elapsed, the process continues with S2.

If the time has elapsed, the value determined at S3 is recorded at S9 and the operation then shifts to normal operation at S10. Recording the value at S3 is indicative of the amount of soot that is being generated during the combustion operation and may indicate abnormal operating activity, which can be fed into a computer and alert the user, or in severe events shut down the operation.

Reference is now made to the following examples for illustrative purposes.

EXAMPLE 1

Gasoline is used as the hydrocarbon fuel. The fuel processing catalytic system includes a reformer, a water gas shift reactor (WGS), and a selective CO eliminating reactor (preferential oxidizer, PROX). To warm up the fuel processing system at startup, fuel and air are introduced into the mixer of the startup combustor and mixed, and fuel is burned using a glow plug. For this purpose, the air and fuel injection rate is set to an excess air ratio of 3, and the gas temperature directly before the filter is approximately 900° C.

When this is done, a minimal quantity of soot is produced during combustion of fuel with air. However, since a filter is provided at the farthest downstream point of the combustion zone, soot is trapped and eliminated from the startup combustion gas, which is supplied to the reformer to increase its temperature.

The filter is composed of materials that have a heat resistance of 1000° C. or more, such as SiC, cordierite, and ceramic fiber, and preferably have cavities with an effective diameter of about 10 to 100 µm. In the present example, an SiC filter (0.5 L) is used, comprising a monolithic SiC honeycomb structure with cavity diameter of approximately 25 µm, having its passages blocked at alternate ends.

At startup, soot accumulates on the SiC honeycomb wall on the startup combustor side, and simultaneously soot is burned by the oxygen in the startup combustion gas. The momentary soot combustion amount is determined by the quantity of soot on the SiC honeycomb wall at the time. Taking the combustion gas flow rate as constant, the greater the amount of soot accumulated, the greater the amount of soot burned, and the higher the temperature rise at filter outflow. Conversely, when there is little soot on the SiC honeycomb wall, the soot combustion amount is small, and the temperature at filter outflow rises minimally.

Consequently, the filter outflow gas temperature sometimes exceeds the combustion gas temperature of 900° C. In the present case, the critical temperature for reformer heat resistance is 950° C. In such a case, if filter outflow gas temperature threatens to exceed the critical temperature of the reformer, the gas on the downstream side is mixed with secondary air. Secondary air is introduced from a vaporizer in a swirling motion along the combustor wall, so that it mixes with the combusted gas. Flow rate of the secondary air is adjusted in accordance with the filter outlet temperature and gas flow rate, so that gas temperature at reformer inlet is maintained at approximately 900° C.

In addition, since the filter cavities become more clogged as the soot accumulation increases, it is necessary to burn and eliminate the soot in the filter when the soot accumulation reaches a predetermined amount. In this case, too, since gas temperature at filter outflow rises, the flow rate of secondary air is adjusted in accordance with filter outlet temperature and gas flow rate, so that the gas temperature at the reformer inlet is about 900° C.

EXAMPLE 2

Implementation of Example 2 is the same as implementing Example 1, except that soot accumulation amount is captured by calculations based on soot formation amount per unit time, as established by tests taking soot accumulation amount at previous startups as a baseline.

EXAMPLE 3

Implementation of Example 3 is the same as implementing Example 1, except that gas temperature at filter outflow is adjusted by cooling with a water spray.

EXAMPLE 4

Implementation Example 4 is the same as implementing Example 1, except that a two-stage filter is used with the combustor.

The present invention has been described herein with reference to certain preferred embodiments. However, as all of these obvious various thereon will become apparent to those skilled in the art, the invention is not to be considered as limited thereto.

What is claimed is:

1. A startup combustor that is used at startup to warm a fuel reformer characterized by:
 a chamber for combusting fuel;
 a fuel port connected to the chamber for introducing fuel;
 an air port connected to the chamber for introducing air;
 an ignition source connected to the chamber for igniting fuel and air introduced thereto;

a filter within the chamber, which is capable of preventing a substantial portion of any soot contained in the air or fuel or which can develop from combusting the fuel with the ignition source from passing through the filter;

a controller for regulating the introduction of air and fuel to the chamber and capable of maintaining an excess air ratio to regenerate the filter; and a means for detecting soot accumulation onto the filter, wherein the means for detecting the soot accumulation onto the filter comprises a differential pressure gauge.

2. A startup combustor that is used at startup to warm a fuel reformer characterized by:

a chamber for combusting fuel;

a fuel port connected to the chamber for introducing fuel;

an air port connected to the chamber for introducing air;

an ignition source connected to the chamber for igniting fuel and air introduced thereto;

a filter within the chamber, which is capable of preventing a substantial portion of any soot contained in the air or fuel or which can develop from combusting the fuel with the ignition source from passing through the filter;

a controller for regulating the introduction of air and fuel to the chamber and capable of maintaining an excess air ratio to regenerate the filter;

the startup combustor characterized by being able to predict the filter outlet temperature from the amount of soot accumulated on the filter and performing an operation that lowers the outlet temperature of the combusted gases exiting the filter; and an inlet port downstream of the filter and before a reformer, which is capable of introducing water to the combusted gases to cool an inlet temperature of the reformer.

3. A process for operating a startup combustor to regenerate a filter, the process comprising:

combining air and a hydrocarbon fuel to form an air hydrocarbon fuel mixture;

combusting the mixture to form a combustion gas that can also contain soot;

passing the combusted gas through a filter to collect any soot onto the filter;

when a predetermined amount of soot has collected on the filter, regenerating the filter by introducing an excess air ratio of about 1.5 to about 2.8 for a set period of time to oxidize the collected soot on the filter;

determining a filter outlet temperature based on a level of the soot accumulated on the filter; and performing an operation that lowers an outlet temperature of the combusted gases exiting the filter, wherein the operation that lowers the outlet temperature of the combusted gases exiting the filter is achieved by introducing water to the combusted gases.

* * * * *